United States Patent [19]
Odajima

[11] Patent Number: 4,938,829
[45] Date of Patent: Jul. 3, 1990

[54] PROCESS OF MAKING A DIAPHRAGM OF VITREOUS HARD CARBONACEOUS MATERIAL FOR AN ACOUSTIC DEVICE

[75] Inventor: Hideo Odajima, Fujioka, Japan

[73] Assignee: Mitsubishi Pencil Co., Ltd., Higashiohi, Japan

[21] Appl. No.: 388,753

[22] Filed: Aug. 3, 1989

Related U.S. Application Data

[63] Continuation of Ser. No. 239,265, Sep. 1, 1988, abandoned.

[51] Int. Cl.$^5$ .................... B29C 65/54; C01B 31/02
[52] U.S. Cl. .................... 156/245; 156/327; 156/330.9; 156/333; 156/337; 264/29.6; 264/29.7; 264/250; 423/449
[58] Field of Search .................... 264/29.1, 29.5, 29.6, 264/29.7, 134, 250, 294; 156/242, 245, 327, 330.9, 333, 337; 427/227; 423/445, 449; 181/167

[56] References Cited

U.S. PATENT DOCUMENTS 3,626,042 12/1971 Appleby et al. .................... 264/29.1
4,221,773 9/1980 Tsukagoshi et al. .................... 423/445
4,456,645 6/1984 Chi .................... 264/29.1 X
4,550,015 10/1985 Korb et al. .................... 423/445

FOREIGN PATENT DOCUMENTS 60-121895 6/1985 Japan .................... 423/449

Primary Examiner—Jeffery Thurlow
Assistant Examiner—Leo B. Tentoni
Attorney, Agent, or Firm—Oliff & Berridge

[57] ABSTRACT

A process for producing a diaphragm for an acoustic device, the diaphragm being formed of vitreous hard carbonaceous material, including the steps of preliminarily molding, in film or sheet shapes, vitreous hard carbon thermosetting resin which, upon calcining, exhibits high hardness and gas impermeability, molding a diaphragm in a desired diaphragm shape and a voice coil bobbin in a desired voice coil bobbin shape from said preliminary moldings, calcining the diaphragm molding and the voice coil bobbin molding, and forming an integral structure of the diaphragm and the voice coil bobbin by calcining in an inert gas atmosphere, a composite material comprising the diaphragm molding and the voice coil bobbin molding with an organic liquid composition positioned therebetween, the organic liquid composition exhibiting high carbon residual yield. Thus, the diaphragm can transmit a driving force generated in a voice coil to the diaphragm without loss, without aging fatigue (such as creep) of the material, irrespective of external environments (such as temperature and moisture) and with excellent heat resistance in an integral structure of the diaphragm.

5 Claims, 1 Drawing Sheet

PROCESS OF MAKING A DIAPHRAGM OF VITREOUS HARD CARBONACEOUS MATERIAL FOR AN ACOUSTIC DEVICE

BACKGROUND OF THE INVENTION

The present invention relates to a process for producing a diaphragm of vitreous hard carbonaceous material for use in an acoustic device. More particularly, the invention relates to a process for producing a diaphragm of vitreous hard carbonaceous material having high hardness, high strength and high elasticity as compared with a conventional diaphragm material used as a speaker and a microphone, the diaphragm undergoing less deformation when subjected to an external force due to excellent rigidity of the diaphragm. The diaphragm also exhibits small distortion of sound, wide sound range reproduction and distinct sound quality. In addition, the internal structure of the diaphragm and the voice coil bobbin provide high rigidity of the entire vibration system so that driving forces generated in a voice coil are transmitted to the diaphragm without loss since energy is not lost at a bonded portion having decreased rigidity. The diaphragm provides excellent responsiveness to input signals and is adapted for digital audio use.

It is generally desired that a diaphragm for a speaker and a voice coil bobbin satisfy the following conditions:
(1) small density,
(2) large Young's modulus,
(3) large propagating velocity of sounds,
(4) adequately large internal loss of vibration,
(5) stability against variation in atmospheric conditions,
(6) resistance to deformation and change of properties, and
(7) simple and inexpensive producing process.

More specifically the material for the diaphragm is required to have high fidelity over a broad frequency band. To efficiently and distinctly produce sound quality, the material should have high rigidity and no distortion such as creep against external stress To further increase the sound velocity (calculated from the equation of $$V = (E/\rho)^{\frac{1}{2}}$$

where V is sound velocity, E is Young's modulus, $\rho0$ is density), the material is required to have small density and high Young's modulus.

In addition to the above-mentioned conditions, in the case of a voice coil bobbin, the material must have resistance to Joule heat generated due to voice current flowing in a voice coil.

The conventional materials for the diaphragm and voice coil bobbin use paper (pulp), plastic, aluminum, titanium, magnesium, beryllium, or boron as basic materials, and further contain glass fiber, carbon fiber, or processed metal alloy, metal nitride, metal carbide, or metal boride mixed with the basic material. However, paper, plastic and their composite materials have small Young's modulus and small density. Thus, the sound velocities of these materials are low. Vibration division occurs in a specific mode and the frequency characteristics in the high frequency band of the materials are particularly low, resulting in difficulty in producing distinct sound quality. In addition, these materials are affected by external environments such as temperature and moisture, causing deterioration in the quality and aging fatigue.

On the other hand, when metal plates of aluminum, magnesium or titanium are employed for the diaphragm and voice coil bobbin, the sound velocities of the materials are high, but the materials exhibit sharp resonance in high frequency bands and small internal loss of vibration or aging fatigue such as creep occurs in the materials. The use of materials such as boron, beryllium, their nitrides, carbide or boride for the diaphragm and voice coil bobbin provides excellent physical properties. The use of such materials as the diaphragms in tweeters extends the range of audible frequency bands which can be reproduced, so that natural sound quality can be produced without transient phenomena caused by signals in the audible band. However, these materials are very expensive, and are difficult to machine. The conventional process for producing the diaphragm by rolling and press molding is not practical and should employ a depositing method such as chemical vapor deposition or physical vapor deposition. These processes are expensive and it is difficult to produce speakers of large size.

In addition to the above-described defects, even if materials having excellent physical properties are used for a diaphragm, since the materials for the conventional voice coil bobbin are mainly paper (pulp), such as kraft paper, the rigidity of the entire vibration system resultantly decreases, the rigidity of the entire vibration system also decreases due to the presence of a bonding layer for bonding the diaphragm to the voice coil bobbin, and the materials have drawbacks in that an energy loss occurs at the bonding layer when transmitting the driving force generated in the voice coil to the diaphragm.

SUMMARY OF THE INVENTION

Accordingly, an object of the present invention is to provide a process for producing a diaphragm for an acoustic device, the diaphragm being of vitreous hard carbonaceous material, which can eliminate the above-described drawbacks of the materials for conventional diaphragms and voice coil bobbins, and which can transmit a driving force generated in a voice coil to the diaphragm without loss, without aging fatigue (such as creep) of the materials, irrespective of external environments (such as temperature and moisture), with excellent heat resistance by utilizing the excellent properties of carbon in an integral structure of the diaphragm and the voice coil bobbin, can faithfully reproduce wide frequency range from a low sound range to a high sound range and can generate a distinct quality of tone inexpensively in industry.

According to the present invention, vitreous hard carbon which contains as a raw material only thermosetting resin has excellent physical properties, such as high hardness, high strength and high elastic modulus, as well as high workability. The process for producing a diaphragm for an acoustic device, the diaphragm being of vitreous hard carbonaceous material, comprises the steps of preliminarily molding in film or sheet shapes vitreous hard carbon thermosetting resin which, upon being calcined, exhibits high hardness and gas impermeability, molding a diaphragm in a desired diaphragm shape and a voice coil bobbin in a desired voice coil bobbin shape from the preliminarily molded film or sheet-like moldings, calcining the diaphragm molding and the voice coil bobbin molding and then forming an integral structure of the diaphragm and the voice coil bobbin by calcining in an inert gas atomsphere the diaphragm molding and the voice coil bobbin molding with an organic liquid composition exhibiting high carbon residual yield positioned therebetween.

A process for producing a diaphragm for an acoustic device of vitreous hard carbonaceous material according to the present invention will now be described.

A predetermined amount of hardener is added to a thermosetting resin and the mixture is then kneaded by a high speed adjuster or a three-roll mixer to disperse the hardener. Then, air bubbles are removed through a reduced pressure defoaming machine, if necessary. The obtained raw liquid is then preliminarily molded to a film or sheet of the desired thickness via a coater or calender rolls by using a back sheet having a separable film.

Then, the back sheet of the film or sheet is removed from the preliminarily molded film or sheet, which has sufficient (in B stage) plasticity. The preliminarily molded film or sheet is then molded in a desired diaphragm shape by a press molding machine, a vacuum molding machine or a blow-molding machine. In this case, the film or sheet may be suitably increased in plasticity by adequately heating or may be hardened by a hardening reaction. After sufficient hardening, the film or sheet is removed from the mold.

To form a voice coil bobbin molding, preliminarily molded film or sheet obtained by the above-mentioned operation is cut in a desired rectangular shape and the back sheet is then removed and wrapped around a smooth-surfaced round rod or pipe having desired dimensions. The preliminarily molded film or sheet is fixedly secured at both ends thereof. The voice coil bobbin molding obtained by the above-mentioned operation is heated at 50° to 300° C., sufficiently cured and then removed from the mold.

The diaphragm molding and the voice coil bobbin molding obtained by the above-mentioned operations are further insolubilized and infusibilized in a heated air oven at an ambient or an elevated temperature and then bonded by an organic liquid composition.

Examples of organic liquid compositions usable in the present invention are thermoplastic resins, such as polyvinyl chloride, chlorinated vinyl chloride resin; thermosetting resins, such as phenol resin, furan resin, polyimide; natural high molecular substances, such as tragacanth gum; asphalt pitches, such as petroleum asphalt, coal tar pitch; and one or more types of compositions of dry distilled pitches obtained by dry distilling organic high molecular weight molecules in which the ortanic high molecular weight substances or pitches are not liquid at ambient temperatures. The organic liquid composition may comprise a condensate dissolved in a solvent or a thermally melted material The organic liquid composition coated between the diaphragm molding and the voice coil bobbin molding is bonded by heating and/or by removal of its solvent to induce solidification.

Examples of thermosetting resins usable in the present invention are furan resins, phenol resins, xylene resins, epoxy resins and bismaleimide resins. Among those, furan resins such as furfuryl alcohol/furfurals, furfural/phenols, furfural/ureas, phenol resins such as resols, novolaks, and their mixtures are preferable for their favorable workability properties, including retention of shape during preparation, favorable calcining times and for economical reasons.

In a preferred feature, the diaphragm, the voice coil bobbin and the organic liquid composition are of the same material so as to be of similar shrinkage and calcining times.

The integral structure obtained by the above-described operation is contained in a calcining sheath and thermally calcined (to be carbonized) at 1000° to 1500° C. in an inert gas such as nitrogen or argon. In the calcining step, it is important to gradually heat the structure at 50° C./hr. or lower and preferably 20° C./hr. or lower up to 500° C. so as to prevent it from being deformed and cracked. In a range of 500° C. or higher, the structure is heated at 20° to 200° C./hr., more preferably 50° to 100° C./hr. (for economical reasons), then maintained at the highest temperature for 1 to 5 hours so as to obtain homogeneous carbonization, then allowed to stand to cool, and calcined to complete the diaphragm structure.

BRIEF DESCRIPTION OF THE DRAWING

The FIG. 1 is a graph showing a comparison of the frequency characteristics of a tweeter of Example 1 with a tweeter bonded by an ordinary adhesive, where the ordinate indicates loudness (in decibels), and the abscissa indicates frequency (in Hz.).

DESCRIPTION OF THE PREFERRED EMBODIMENTS

Figure 1:
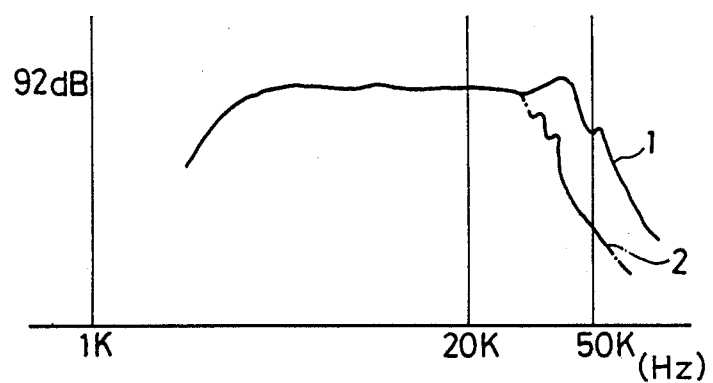

The present invention will be described by examples for producing a diaphragm for an acoustic device of vitreous hard carbonaceous material, but the present invention is not limited to the particular examples.

EXAMPLE 1

4 wt. % of p-toluenesulfonic acid-50%-methanol solution was added as a hardener to 100 wt. % of initial condensate of furfural alcohol/furfural resin (VF-302 produced by Hitachi Chemical Co., Ltd., Japan), the mixture was then defoamed through a reduced pressure defoaming machine while sufficiently agitated under room temperature by a high velocity homogeneous mixer. The obtained raw solution was coated on a back sheet having an exfoliating membrane by a coater having a doctor blade set to a thickness of 100 microns, preliminarily hardened and a preliminarily molded sheet having sufficient plasticity (in B stage state) was obtained.

Then, the back sheet was removed, the preliminarily molded sheet was then molded in a dome shape by a vacuum molding machine which used a domed molding die having a bore of 30 mm in diameter, thermally hardened by hot air at 80° C, removed from the mold and a diaphragm molding was obtained.

To form a voice coil bobbin, a preliminarily molded sheet 60 microns thick, obtained in a manner similar to the above operation, was cut to a size of 95×6 mm, the back was removed, and the preliminarily molded sheet was wound on a smooth-surfaced ceramic pipe of 30 mm outer diameter and fixed at both ends thereof. Then, the sheet thus wound on the pipe was held at 100° C. for 10 hours and further at 180° C. for 24 hours in an air oven to be insolubilized and infusibilized and the cured molding was removed from the ceramic pipe to obtain a voice coil bobbin molding. Thereafter, 2 wt. % of hardener (A-3 hardener produced by Hitachi Chemical Co., Ltd., Japan) was added to furan initial condensate, the mixture was then sufficiently agitated, the bottom of the dome of the diaphragm molding was bonded to the voice coil bobbin molding, allowed to stand at ambient temperature for 3 hours so as to solidify, further heated to 180° C. to be insolubilized and infusibilized, then contained in a calcining sheath, heated at 15° C./hr. up to 500° C. in a nitrogen gas atmosphere furnace, and then heated at 50° C./hr. from 500° C. to 1000° C. Subsequently, the mixture was held at 1000° C. for 3 hours, then allowed to stand to be cooled, thereby obtaining an integral structure wherein the vitreous carbonaceous diaphragm was bonded to the vitreous carbonaceous voice coil bobbin.

The vitreous carbonaceous dome-shaped diaphragm (a tweeter for reproducing a high frequency sound range) obtained in this manner had a diameter of 23 mm and a thickness of 50 microns. The outer diameter of the voice coil bobbin had a diameter of 23 mm and a height of 5 mm, a thickness of 50 microns, an elastic modulus of 78 GPa, a sonic velocity of 7.5 km/sec., tan $\delta$ $10.0 \times 10^{-3}$, and a density of 1.40 g/cm$^3$.

EXAMPLE 2

15 wt. % of novolak phenol resin (PGA-4500 produced by Gunei Chemical Co., Ltd., Japan) was added to 85 wt. % of novolak phenol resin (PS-1370 produced by Gunei Chemical Co., Ltd., Japan), and a preliminarily molded sheet (of B stage state) having sufficiently soft plasticity and a thickness of 1.5 mm was obtained by an operation similar to that of Example 1. Then, the back sheet was removed, molded in a press molding machine mounted with a metal mold set at 170° C. to a cone shape having a diameter of 35 cm, hardened and removed from the mold, thereby obtaining a diaphragm molding.

To form a voice coil bobbin, a preliminarily molded sheet having a thickness of 0.5 mm obtained by operations similar to those of Example 1 was employed. The sheet was cut to a size of 240×38 mm, the back sheet was then removed, wound on a smooth-surfaced cylindrical metal mold having an outer diameter of 75 mm, fixed at both ends thereof, thermally cured in a press molding machine held at 170° C. for 15 minutes and removed from the mold, thereby obtaining a voice coil bobbin molding. Then, phenol resin was treated to form an organic liquid composition which was used in a manner similar to Example 1. The liquid composition was solidified at 100° C. in a heating oven and further heated to 180° C. Then, similarly to Example 1, it was calcined at 1300° C. to bond the vitreous carbonaceous diaphragm to the vitreous cabonaceous voice coil bobbin to form an integral structure.

The vitreous hard carbonaceous cone type diaphragm (a woofer for reproducing a low-frequency sound range) thus obtained had a diameter of 27.5 cm and a thickness of 0.9 mm. The voice coil bobbin had an outer diameter of 6.0 cm, a height of 3.0 cm, a thickness of 0.4 mm, an elastic modulus of 64 GPa, a sonic velocity of 6.8 km/sec., tan$\delta$ $1.3 \times 10^{-2}$ and a density of 1.38 g/cm$^3$.

The properties of the diaphragm obtained by the present invention are compared with the properties of conventional diaphragm material and the results are as listed in Table 1 below. The frequency characteristics of the tweeter of Example 1 are compared below with those of diaphragms bonded with an ordinary adhesive without the provision of an intermediary carbon bonding layer.

TABLE 1

| Materials | Sound velocity (km/sec) | Elastic modulus (GPa) | tan$\delta$ ($\times 10^{-3}$) | Density (g/cm$^3$) |
|---|---|---|---|---|
| paper (pulp) | 1.0–2.4 | 0.2–4.0 | 20–60 | 0.2–0.7 |
| polypropylene | 1.3 | 1.5 | 60 | 0.9 |
| aluminum | 5.1 | 70.0 | | 2.7 |
| titanium | 4.9 | 110.0 | 2–3 | 4.5 |
| magnesium | 5.1 | 44.0 | | 1.7 |
| beryllium | 12.2 | 270.0 | | 1.8 |
| Example 1 | 7.5 | 78.0 | 10.0 | 1.40 |
| Example 2 | 6.8 | 64.0 | 13.0 | 1.38 |

As understood from the above table, in Examples 1 and 2, the diaphragms exhibit properties not equivalent to those of beryllium, but excellent as compared with paper (pulp) and polypropylene and approximately one and half times of the sonic velocity as compared with metal materials, such as aluminum or titanium.

Though not shown in the table, the expansion coefficients of the vitreous carbons of Examples 1 and 2 were 2.3 to $3.0 \times 10^{-6}$/° C. with an oxidation starting temperature of 400° C. or higher. Thus, the material can sufficiently endure Joule heat generated by a voice current flowing in the voice coil.

As shown in the drawing, it is also understood from the comparison of the tweeter (1) of Example 1 with tweeters bonded with ordinary adhesives that the tweeter of Example 1 has a higher frequency band limiting frequency than the conventional tweeter.

The excellent characteristics of the diaphragm of carbonaceous material having an integral structure by virtue of the carbon bonding layer between the diaphragm and the voice coil bobbin can produce sufficient capacity to perform as a diaphragm for digital audio equipment of a compact disk player. Such players provide distinct sound quality and wide dynamic range and the diaphragm having this high performance can be inexpensively produced by a simple process.

What is claimed is:

1. A process for producing a diaphragm for an acoustic device, the diaphragm being formed of vitreous hard carbonaceous material, comprising the steps of:
    preliminarily molding, in film or sheet shapes, vitreous hard carbon thermosetting resin which, upon calcining, exhibits high hardness and gas impermeability,
    molding a diaphragm in a desired diaphragm shape and a voice coil bobbin in a desired voice coil bobbin shape from said preliminary moldings, calcining the diaphragm molding and the voice coil bobbin molding, and
    forming an integral structure of the diaphragm and the voice coil bobbin by calcining in an inert gas atmosphere a composite material comprising the diaphragm molding and the voice coil bobbin molding with an organic liquid composition positioned therebetween, the organic liquid composition exhibiting high carbon residual yield.

2. The process according to claim 1, wherein said organic liquid composition comprises an organic composition selected from the group consisting of thermoplastic resins, thermosetting resins, natural high molecular weight substances, asphalt pitches, and dry distilled pitches obtained by dry distilling organic high molecular weight materials which are not liquid at ambient temperatures.

3. The process according to claim 1, wherein said thermosetting resin is selected from the group consisting of furan resins, phenol resins, xylene resins, epoxy resins, and bismaleimide resins.

4. The process according to claim 1, wherein said organic liquid composition comprises an organic composition selected from the group consisting of polyvinyl chloride, chlorinated vinyl chloride resin, phenyl resin, furan resin, polyimide, tragacanth gum, petroleum asphalt and coal tar pitch.

5. The process according to claim 1, wherein said thermosetting resin is selected from the group consisting of furfuryl, alcohol/furfurals, furfural/phenols, furfural/ureas, resols and novolaks.

* * * * *